United States Patent
Ramones et al.

(10) Patent No.: US 10,996,547 B2
(45) Date of Patent: May 4, 2021

(54) ELECTRONIC DEVICE MOUNT

(71) Applicant: Arlo Technologies, Inc., Carlsbad, CA (US)

(72) Inventors: John Kui Yan Ramones, San Ramon, CA (US); Christopher Vincent Fonzo, Carlsbad, CA (US); Beau Oyler, Walnut Creek, CA (US); Dayne Nathaniel Tanner, Concord, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 135 days.

(21) Appl. No.: 16/136,485

(22) Filed: Sep. 20, 2018

(65) Prior Publication Data

US 2020/0096842 A1  Mar. 26, 2020

(51) Int. Cl.
*G03B 17/56* (2021.01)
*F16M 11/04* (2006.01)
*F16M 11/12* (2006.01)

(52) U.S. Cl.
CPC ......... *G03B 17/561* (2013.01); *F16M 11/041* (2013.01); *F16M 11/126* (2013.01); *F16M 2200/024* (2013.01)

(58) Field of Classification Search
CPC ........ F16M 11/00; F16M 11/02; F16M 11/04; F16M 11/06; F16M 11/08; F16M 11/10; F16M 13/02; F16M 13/022; F16M 13/027; F16M 11/041; F16M 11/12; F16M 11/126; F16M 11/2035; F16M 11/2064; F16M 2200/024; G03B 17/02; G03B 17/561
USPC .......................................................... 396/428
See application file for complete search history.

(56) References Cited

U.S. PATENT DOCUMENTS

2010/0034530 A1* 2/2010 Son .................. G03B 17/00
396/427
2018/0187828 A1* 7/2018 Law .................... F16M 11/125

* cited by examiner

*Primary Examiner* — Clayton E. LaBalle
*Assistant Examiner* — Fang-Chi Chang
(74) *Attorney, Agent, or Firm* — Boyle Fredrickson, SC

(57) ABSTRACT

A directionally adjustable magnetic mounting system is disclosed for use with a small electronic device such as a wireless camera. The mounting system includes a camera mount having a mounting surface configured to selectively and alternatively magnetically engage any one of a plurality of mount engaging locations on the electronic device in an angular orientation that is variable relative to a longitudinal centerline of the camera mount. Also disclosed is a method of using the mounting system.

17 Claims, 13 Drawing Sheets

ELECTRONIC DEVICE MOUNT

BACKGROUND OF THE INVENTION

1. Field of the Invention

The invention relates generally to a magnetic mounting apparatus for an electronic device, and more particularly, relates to a magnetic mounting device that can be anchored in multiple orientations for magnetically supporting a directionally adjustable electronic device such as a camera. The invention additionally relates to a method of using the same.

2. Discussion of the Related Art

As the market for small electronic devices has continued to expand, the availability and accessibility of cameras has similarly experienced growth. The camera industry has experienced significant expansion as a result of the improvement of digital photography, and the introduction of high-quality digital image sensors into a growing field of small electronic devices, such as webcams, wireless network compatible cameras, handheld camcorders, action cameras, etc. These various cameras have become increasingly commonplace, largely driven by their flexibility and general ease of use.

For example, wireless network compatible cameras often are used for a variety of purposes including home security, business security, child monitoring, pet monitoring, etc. Additionally, many of these cameras offer beneficial features such as night vision through the use of infrared LEDs, high definition widescreen video, digital zoom, motion detection, audio alerts, etc.

Despite the many various uses for these small electronic devices, such as wireless network compatible cameras, one common need is the ability to mount the device in a desired location. That is to say, in remote monitoring systems of various types, including those that employ small cameras, it is a general need and desire to mount the camera to a support surface. For example, in the context of an exterior security system, there is a need to mount one or more cameras around the perimeter of a building or property in order to permit monitoring of the building's or property's perimeter.

However, despite the need to mount a small camera in a desired location and position, there remains a need and desire to allow for adjustments to the mounting positions of the camera. For example, when a small camera is employed in the context of an exterior security system, it is often desirable to be able to adjust the camera's angular orientation side-to-side ("panning"), and/or up and down ("tilting") so that it is directed or "aimed" at a specific area of interest, such as a window or doorway. This directional adjustability can be particularly beneficial in the context of small cameras that are installed directly by the end user, and not a security system professional, and that may require various positional adjustments in order to obtain the desired camera field of view. Thus, there is need and desire to provide a camera mount that allows for ease of directional adjustability.

Typical adjustable mounts for small cameras include a clamp that holds the camera in place and that can be loosened to adjust the camera's angular orientation and then retightened. A common type of mount includes a ball and joint style bracket that is bolted or otherwise affixed to the camera. In order to lock a camera having this style of mounting device in a desired orientation, a frictional clamp that engages the ball when the camera is in the desired angular orientation must first be disengaged or loosened. Then, once the camera is placed in the desired position, it must be held there while the frictional clamp reengages and tightens around the ball. Tightening the clamp of such a mechanism may unintentionally move the camera such that the angular orientation of the camera may be skewed from its desired orientation, requiring re-adjustment. Additionally, repositioning of the camera often necessitates the use of two hands and is a time-consuming process, requiring the mounting lock to be released, the camera to be repositioned, and the mounting clamp to be reengaged in sequence.

Furthermore, often a wireless camera is equipped with a single mount attachment point, such as a threaded socket for receiving a bolt-on mount or an inwardly curved surface for receiving and engaging a partially spherical magnetic mount. The presence of a single mount attachment point often limits the possible locations in which the mount may be anchored to a support surface while still achieving a desired camera field of view. Moreover, the presence of a single mount attachment point on a wireless camera or similar small electronic device may prohibit the mount from being secured in the desired location for the sake of maintaining the device's field of view. That is to say, for example, a wireless camera may not be configured for ceiling or table top mounting due to the location of its single mount attachment point.

In light of the foregoing, an electronic device, such as a camera, having mount that exhibits magnetic based secure camera position retention and an ease of camera angular position adjustability is desired.

Also, a mount that exhibits both multiple anchoring orientations relative to a camera housing and multiple engagement locations located on a camera housing is desired.

Also, a method that exhibits both secure electronic device position retention and an ease of electronic device angular position adjustability is also desired.

SUMMARY OF THE INVENTION

One or more of the above-identified needs are met by a directionally adjustable magnetic mounting device for small electronic device, such as a camera including a housing having multiple mount engaging locations. The electronic device has a housing having a plurality of mount engaging locations disposed on an outer surface thereof, the mount engaging locations being spaced from one another. A mount for the device has a mounting surface disposed at a first end portion of the mount and a mounting fixture configured for attachment to a support at an opposing second end portion of the mount. The mounting surface of the mount is configured to selectively and alternatively magnetically engage any one of the plurality of mount engaging locations on the housing to securely retain the housing on the mount in an angular orientation that is variable relative to a longitudinal centerline of the mount.

The angular orientation of the housing may be variable bidirectionally orthogonally relative to a latitudinal centerline and a vertical centerline. For example, if the longitudinal centerline extends vertically, the housing may be variable both horizontally (laterally) and vertically. In the case of a camera, this variability permits adjustment of both pan and tilt angles of the camera.

When the curved mounting surface of the mount engages a selected one of the mount engaging locations on the housing, the electronic device may have an angular range of motion in first and second mutually orthogonal directions of at least 30 degrees in both directions. This angle may exceed 45 degrees and may even be 50 degrees or more. In one configuration, the angle is unidirectional in a first direction such as vertically and bidirectional in a second direction, such as horizontally (laterally).

The mount engaging locations may be located at upper and lower ends, respectively, of a rear surface of the housing.

In accordance with another aspect of the invention, a method is provided of adjusting the position of a camera relative to a mount fixture affixed to a support surface. The mount fixture is provided on a second end portion of a camera mount having a mounting surface disposed at a first end portion thereof. The camera has a camera housing having a plurality of spaced mount engaging locations disposed on an outer surface thereof. The method includes the magnetically engaging a first of the mount engaging locations on the camera housing with the mounting surface of the camera mount with sufficient force to retain the camera in an orientation in which a longitudinal centerline of the camera extends at a first angle relative a longitudinal centerline of the camera mount. A The method additionally includes repositioning the camera such that the first mount engaging location on the camera housing magnetically engages the mounting surface of the camera mount with sufficient force to retain the camera in an orientation in which the longitudinal centerline of the camera extends at second angle relative the longitudinal centerline of the camera mount. The method still additionally includes repositioning the camera such that a second mount engaging location on the camera housing magnetically engages the mounting surface of the camera mount with sufficient force to retain the camera in an orientation in which the longitudinal centerline of the camera extends at a third angle relative the longitudinal centerline of the camera mount.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of electronic devices could be used with a mounting device in accordance with the invention as defined by the claims. Hence, while the preferred embodiments of the invention will now be described with reference to mounting a battery-powered camera for use with a wireless monitoring network, it should be understood that the invention is in no way so limited and other electronic device, such as wired cameras, and others may be used with a mounting device in accordance with the invention as defined by the claims.

Figure 1:
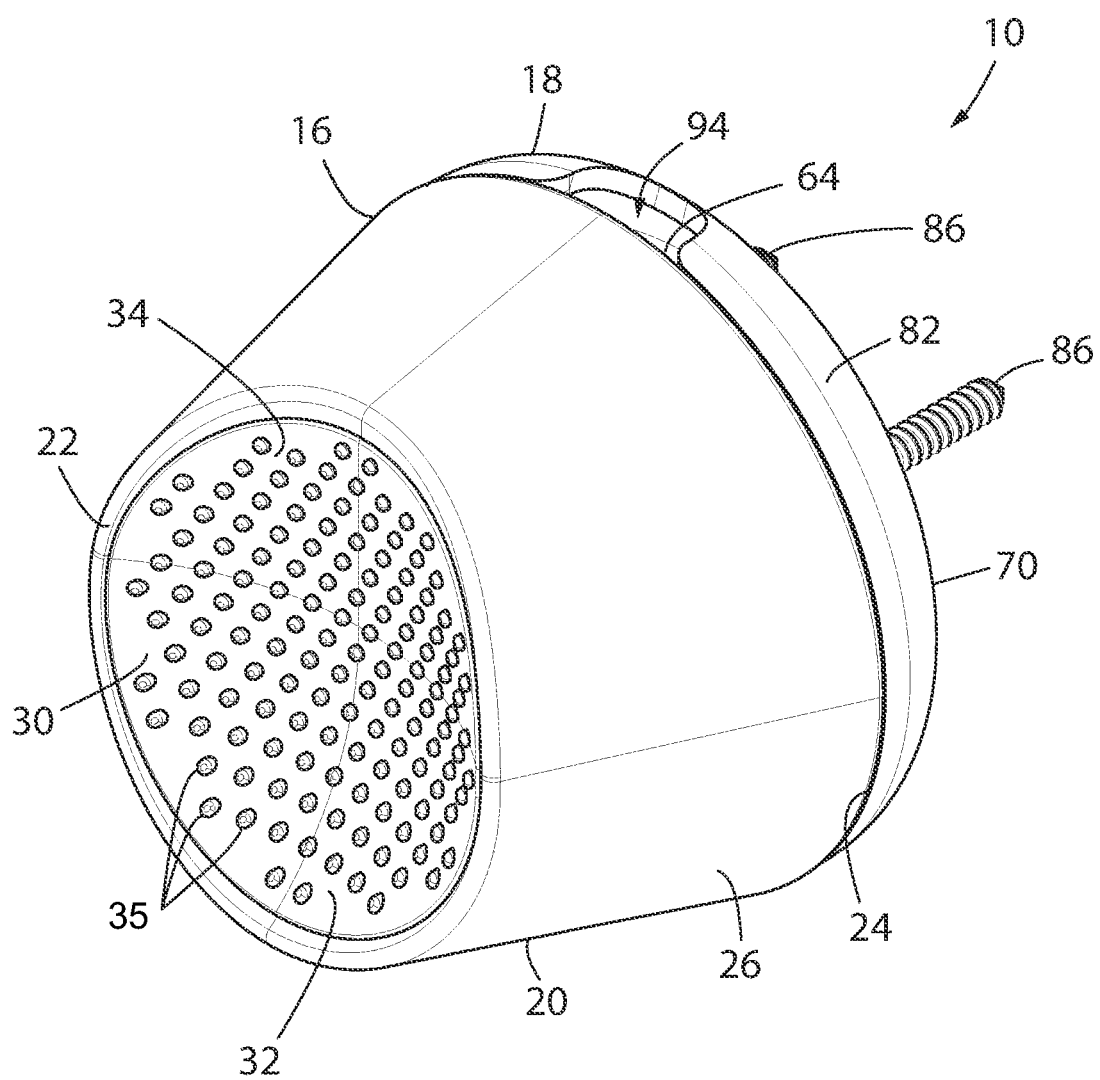
FIG. 1 is a front isometric view of an electronic device mount constructed in accordance with an embodiment of the present invention.
Figure 10:
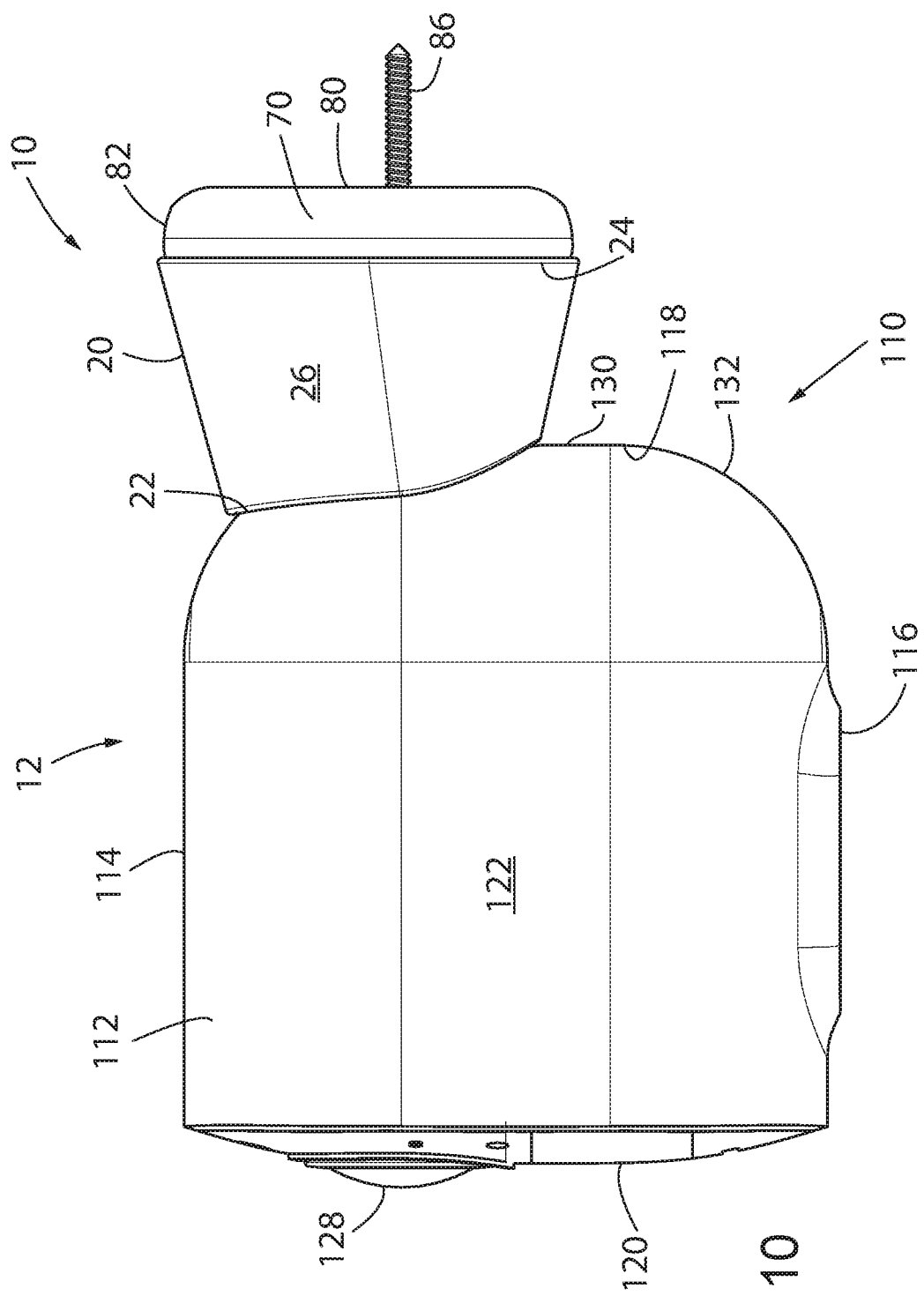
FIG. 10 is a side elevation view of the mount device of FIG. 1, showing the mount engaging a camera in the first angular orientation thereof relative to the mounting device with the mounting device engaging the camera in a second location.
Figure 11:
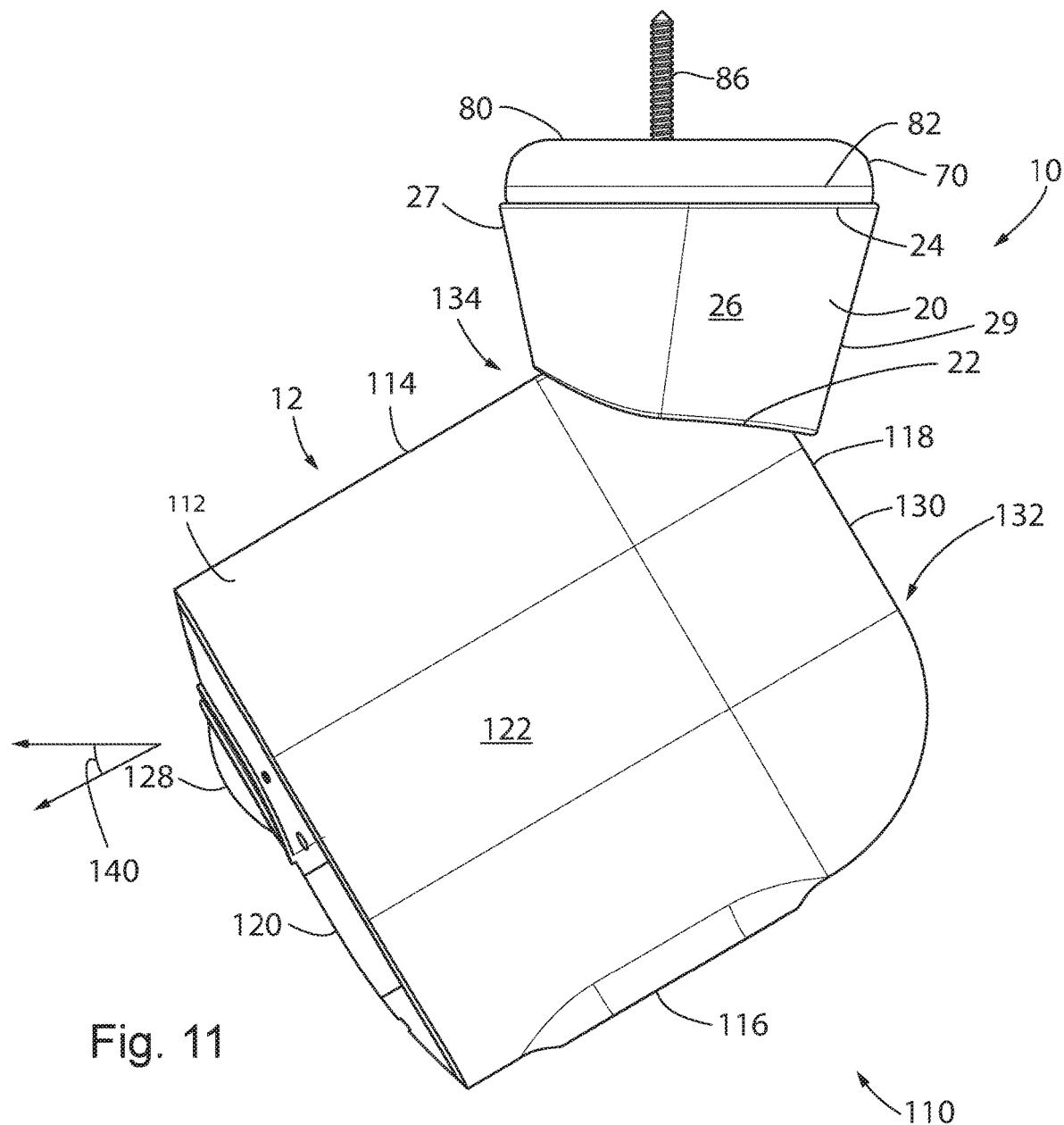
FIG. 11 is a side elevation view of the mount device of FIG. 1, showing the mount engaging a camera in yet angular orientation thereof relative to the mounting device with the mounting device engaging the camera in the second location while the mounting device has been rotated to engage a support surface located above the camera, such as a ceiling.
Figure 13:
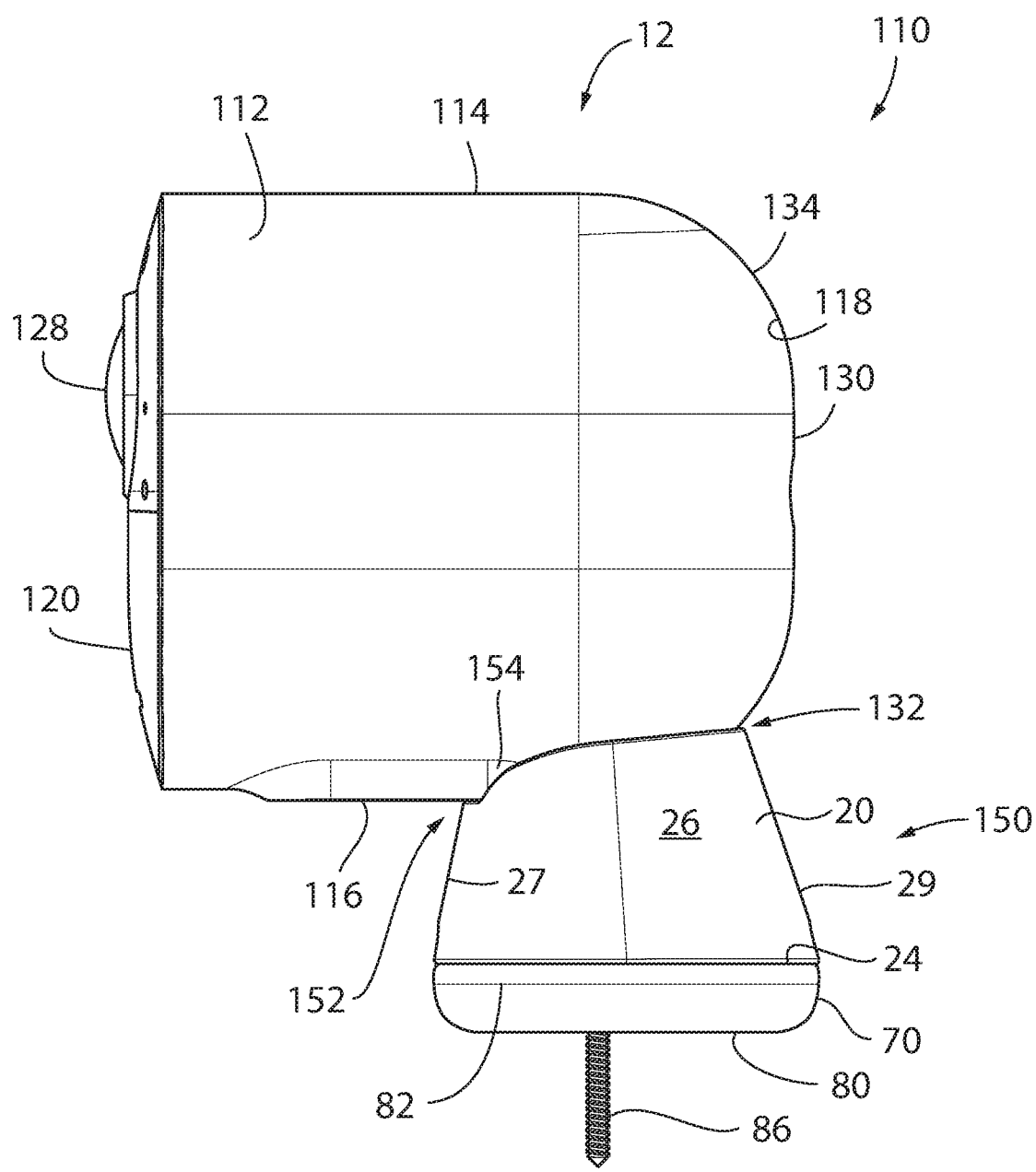

FIG. 1 is an isometric view of a directionally adjustable mounting device 10, i.e., mount, constructed in accordance with one embodiment of the present invention. Referring briefly to FIGS. 3 and 5-10, the mount 10 is configured to support an electronic device, such as a camera 12 in a manner that permits the camera 12 to be securely retained in a desired angular orientation relative to a support surface 14 to which the mount 10 is secured. The mount 10 may attached to the camera 12 at multiple mounting locations on the camera 10, as shown by FIGS. 6 and 10, respectively. Additionally, for each of these discrete mounting locations, the mount 10 may be secured to the support surface 14 in various orientations. That is to say that in one representative orientation the mount 10 may be secured to a support surface 14 that is positioned behind or rearwardly of the camera 12, as shown in FIGS. 3-6. Alternatively, while the mount 10 is still attached to the cameras 12 at the same mounting location, the mount 10 may be rotated 180 degrees about its longitudinal axis 55 and 90 degrees about its latitudinal axis 33, thereby allowing the mount 10 to be positioned such that it can be secured to a support surface 14, such as a table top, that is positioned generally below or underneath the bottom of the camera 12. Such an alternative orientation is shown in FIG. 13 and described in further detail below. Similarly, the mount 10 may be rotated to allow for mounting to a support surface 14 positioned generally above the top of the camera 12, such as a ceiling, as shown in FIG. 11. It should also be understood that the support surface 14 need not be limited to a generally vertical or generally horizontal surface, and that the mount 10 of the present invention is well suited for attachment to a support surface 14 of any angular orientation.

Furthermore, in addition to these multiple mounting locations and multiple mounting orientations, the mount 10 further permits the camera 12 to be angularly repositioned (panned and/or tilted) to a different angular orientation and to be retained in the new position via a magnetic force formed by a magnet disposed within the mount 10 acting upon a ferromagnetic material disposed within the camera 12 as will be described in further detail below. Accordingly, the simultaneous combination of plural mounting locations along the outer surface of the camera 12, and variable mounting orientations of the camera 12 on mount 10 affords panning of the camera 12 and tilting of the camera 12 in a manner that provides a mounted camera 12 with expanded available field of view options relative to the fixed support surface 14.

While FIGS. 3 through 10 show the mount engaging a camera 12, it should be understood that the present invention is not limited to forming a mounting engagement with the depicted camera 12, which is shown by way of a nonlimiting exemplary embodiment that is representative of a small electronic device configured to engage the mount 10. That is to say that the mount 10 in accordance with the present invention is not limited to retaining an electrical device of any particular form but is rather a mount 10 that is configured to magnetically affix a small electronic device that includes a ferromagnetic housing, which is configured to magnetically engage the magnetic mount 10. Alternative examples of small electronic devices that may engage the mount 10 may include motion sensors, lights, speakers, etc.

Figure 2:
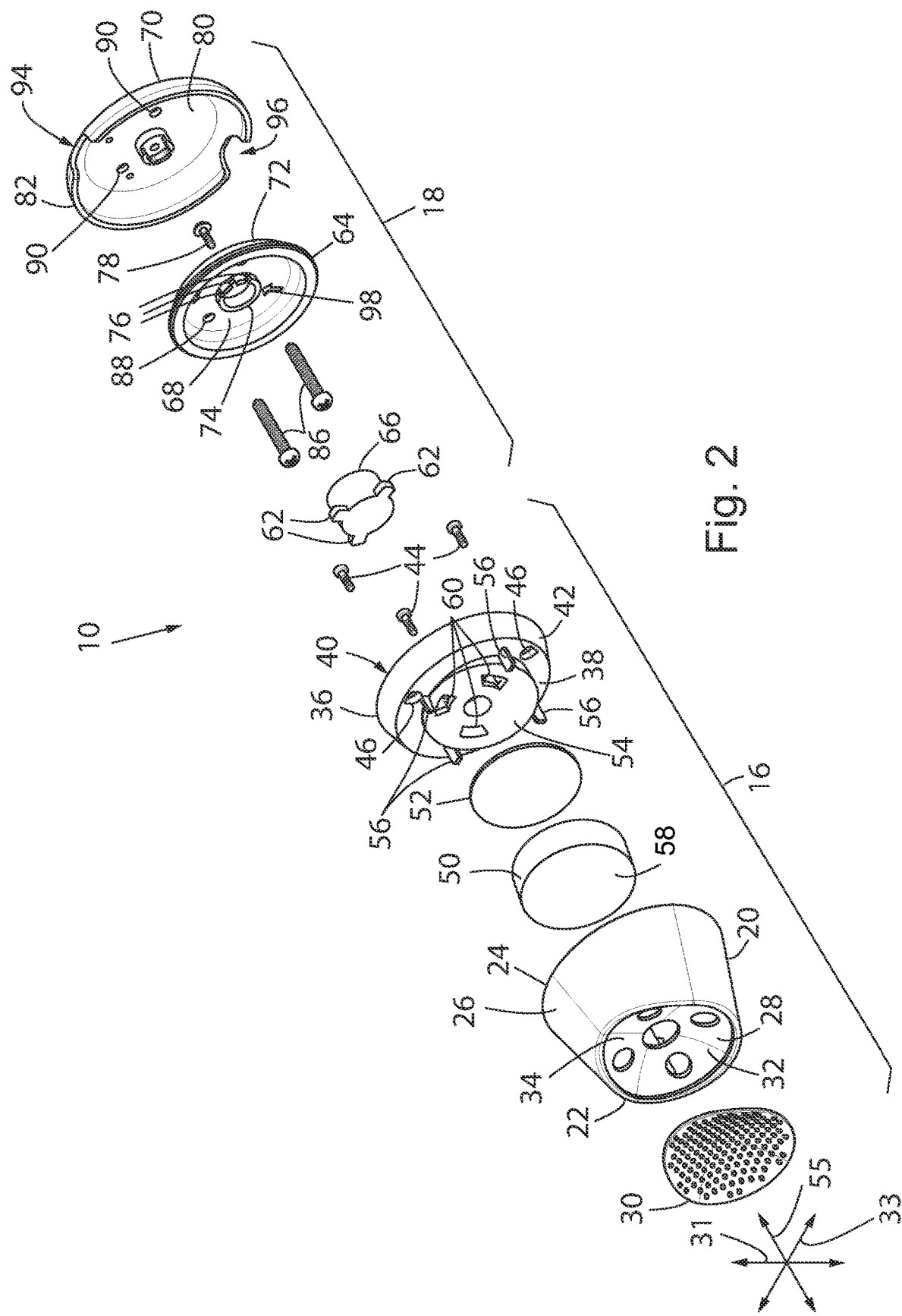
FIG. 2 is an exploded front isometric view of the mount device of FIG. 1 shown along a longitudinal axis of the mount.
Figure 3:
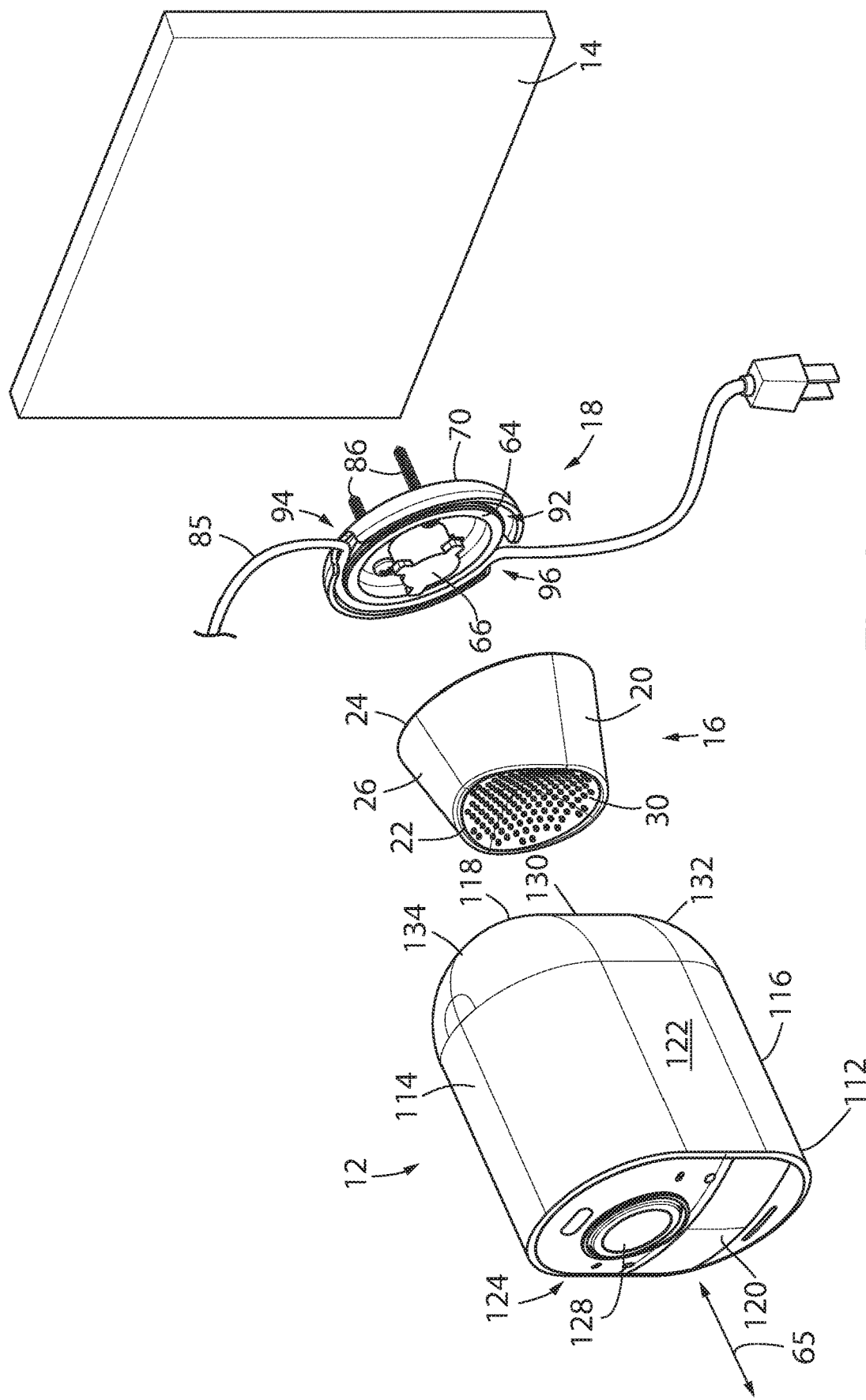
FIG. 3 is a partial exploded front isometric view of a camera, the mount device of FIG. 1 retaining a cable in accordance with one embodiment of the present invention, and a support surface for engaging the mount.
Figure 4:
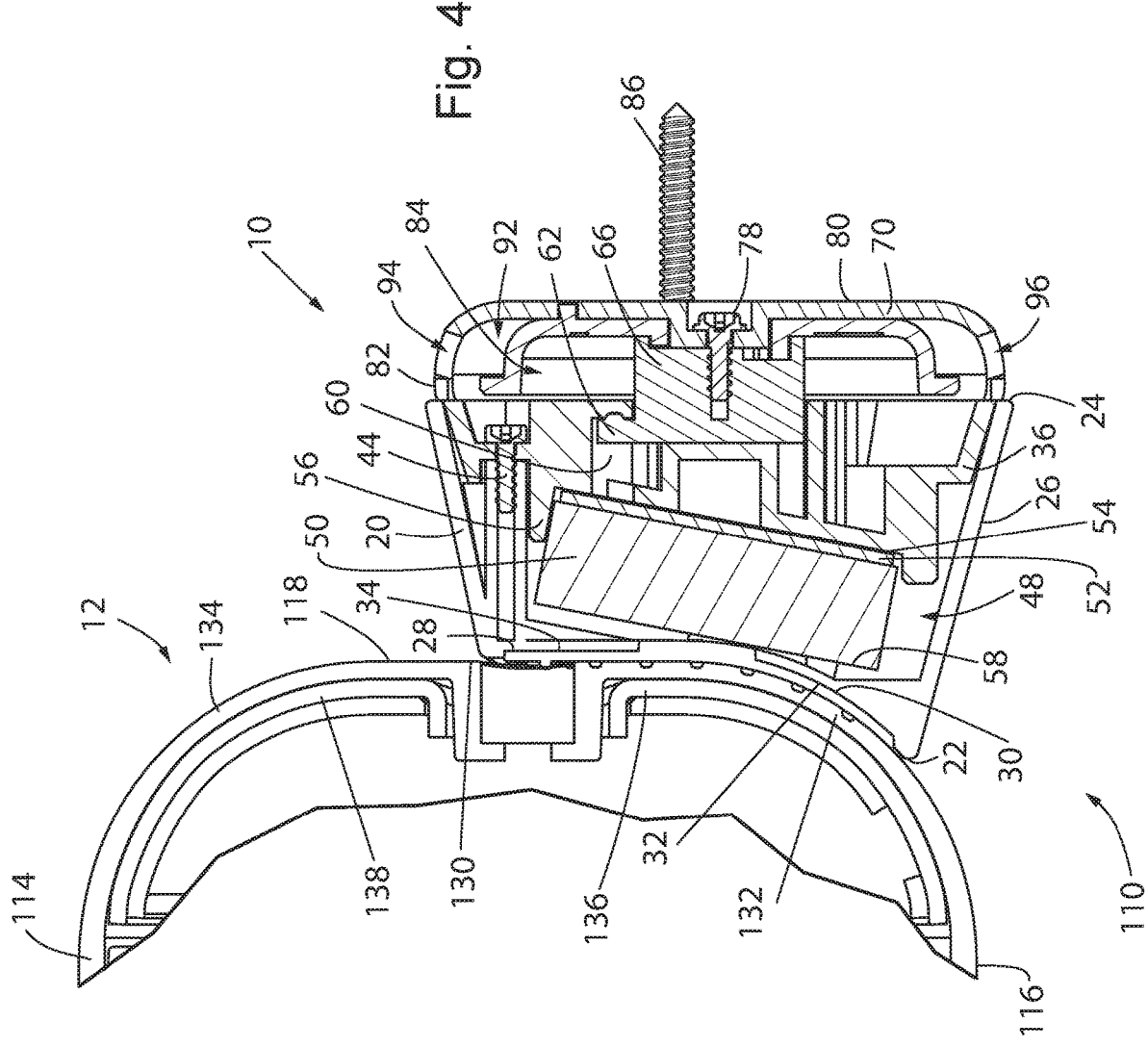
FIG. 4 is a partial side elevation cross-sectional view of the mount device of FIG. 1, showing the mount engaging a camera.

Referring now to FIGS. 1 and 2, the mount 10 includes a housing 16 and a mounting fixture 18, which is configured to engage the housing 16. The housing 16 of mount 10 includes a body 20 having a first end 22, a second end 24, and a sidewall 26 extending between the first end 22 and the second end 24. As shown in FIG. 1, in one embodiment the sidewall 26 is substantially frustoconical with the circumference of the first end 22 being less than the circumference of the second end 24. A curved mounting surface 28, which is configured to engage an outer surface of the camera 12 is generally located at the first end 22 of the body 20, and may include a surface covering 30, such as a thermoplastic, silicon or rubberized material, having a relatively high coefficient of friction of approximately between 0.3 and 0.6. The surface coving 30 may be generally smooth, or alternatively as shown in FIGS. 1 and 2, the surface covering 30 may be textured, and include a plurality of forwardly extending protrusions 35. The protrusions 35 may be generally resilient and configured to deflect when the engaging camera 12 is repositioned, i.e., tiling and/or panning of the camera 12. As will be described in further detail below, and is shown in FIG. 4, the mounting surface 28 is recessed or generally concave relative to the first end 22. More particularly, the mounting surface 28 is generally curvilinear, and may include a variable curvature over the area of the mounting surface 28. As shown in FIGS. 1-3, a first portion 32 of the mounting surface 28, which is positioned at the bottom half of the mounting surface 28 is generally curved in two directions, namely about a vertical axis 31 and a latitudinal axis 33. The second portion 34 of the mounting surface 28, which is positioned at the top half of the mounting surface 28 and above the first portion 32, is generally curved in one direction, namely about a vertical axis 31. As shown in FIG. 4, at vertical cross-section of the mounting surface 28 the first portion 32 of the mounting surface 28 may have an average angle of incline that is relatively greater than the average angle of incline of the second portion 34 of the mounting surface 28. That is to say, that the first portion 32 may have a greater degree of curvature than the second portion 34 of the mounting surface 28. In this configuration, the mounting surface 28 is well adapted to engage a similarly-shaped surface of the housing of a camera 12 or another small electronic device.

Referring to FIGS. 1 and 2, the housing 16 of mount 10 further includes a base 36 that is removably affixed at the second end 24 of the body 20. The base 36 includes a front surface 38, an opposing rear surface 40, and a sidewall 42 extending between the front surface 38 and the rear surface 40. Fasteners 44 affix the base 36 to the body 20, such that base 36 is securely flush mounted within the body 20 at the second end 24 by extending the fasteners 44 through fastener apertures 46 located within the base 36 and engaging the body 20 as is shown in FIG. 4. However, other fastening means are considered well within the scope of the present invention. When the base 36 is affixed to the body 20 to form the enclosed housing 16 of the mount 10 a first cavity 48 is formed that is defined by the surrounding body 20 and base 36. A magnet 50 is located within the cavity 48 and affixed to the front surface 38 of the base 36 via adhesive 52. As is described below, the magnet 50 is configured and oriented to generate a magnetic field that attracts a ferromagnetic portion of the camera 12 towards the mounting surface 28 of the mount 10, and securely retains the camera 12 in a desired location and angular orientation relative to the mount 10.

As shown in FIG. 2, the front surface 38 of the base 36 further includes an angled seat 54 located within a series of circumferentially disposed retaining tabs 56. The seat 54 is configured to adhesive affix the magnet 50 within the angled seat 54 and surround the perimeter of the magnet 50 with the retaining tabs 56. As is shown in the cross-sectional view of FIG. 4, the seat 54 is angled such that when the magnet 50 is retained within the seat 54 a front surface 58 of the magnet 50 lies in a plane that is generally tangential to the curvature of the mounting surface 28 at an approximate midpoint of the mounting surface 28. That is to say that the magnet 50 is positioned such that a location on the front surface 5$ of the magnet contacts or nearly contacts the interior side of the mounting surface 28 at a location approximately equal to a center of the mounting surface 28. In one embodiment of the present invention the angle of the seat 54 is approximately 45 to 90 degrees relative to a longitudinal axis 55 of the mount 10, and more preferable approximately 75 to 85 degrees relative to a longitudinal axis 55 of the mount 10.

Still referring to FIG. 2, in addition to the seat 54, the base 36 further includes a series of slots 60 that extend from the second surface 40 to the first surface 38 of the base 36. The slots 60 are configured to mate in a twist-lock configuration with a corresponding series of protrusions 62 extending from the mounting fixture 18. As will be described in further detail below, in one embodiment, the housing 16, of which the base 36 forms a rear surface, is placed over the mounting fixture 18 that has been affixed to a mounting surface 14, such that the protrusions 62 slide into the slots 60. The housing 16 is then rotated approximately 45 degrees in a twist-lock fashion such that the protrusions 62 are set within the slots 60 to secure the housing 16 to the mounting fixture 18. It should be further understood that while FIG. 2 depicts three protrusions 62 and three slots 60, the present invention is not so limited and alternative numbers of protrusions 62 and slots 60 are well within the scope of the present invention.

Referring now to FIGS. 2 through 4, the mounting fixture 18 will be described in further detail. The mounting fixture 18 includes a disc 64 having a mounting post 66 extending forwardly from a front surface 68 of the disc 64 along the longitudinal axis 55 and a cover 70 extending rearwardly from a rear surface 72 of the disc 64. A mounting ring 74 is located approximately at the center of the front surface 68 of the disc 64 and is configured to engage the mounting post 66. Specifically, one or more orientation grooves 76 are axially disposed within the mounting ring 74 at intervals that are configured to mate with corresponding splines (not shown) within the mounting post 66. In this fashion the interior of the mounting post 66 forms a socket for receiving the mounting ring 74. Securely mating the splines with the grooves 76 requires that the mounting post 66 be in the proper axial rotation. When the mounting post 66 is properly oriented to engage the mounting ring 74, the protrusions 62, which extend radially from the opposing end of the mounting post 66, are properly oriented to correspondingly form a twist-lock engagement with the housing 16 in the desired angular orientation. That is to say that the mating splines and grooves 76 are angularly positioned about a longitudinal axis 55 of the mount 10 to specify the relative angular position of the protrusions 62 and their mating slots 60, when the mount 10 is fully assembled. As shown in FIGS. 2-4, proper orientation of the mounting fixture 18 and housing 16 may result in the asymmetrical curvature of the mounting surface 28 being oriented to receive the camera 12 in a generally upright neutral position. As used herein, the term neutral position of the camera 12 is defined by a longitudinal axis 65 of the camera 12 being positioned generally parallel to the longitudinal axis 55 of the mount 10. Once the mounting post 66 has properly engaged the mounting ring 74, a threaded fastener 78 extends from the rear surface 72 of the disc 64 and into the mounting post 66, such that the disc 64 and mounting post 66 are affixed to one another at the front surface 68 of the disc 64.

The opposing rear surface 72 of the disc 64 is configured to receive the cover 70 when the mounting fixture 18 is affixed to a support surface 14. The cover 70 includes a wall 80 and an annular ridge 82 extending forwardly from a perimeter of the wall 80 towards the front of the mount 10. The wall 80 of the cover 70 is configured to contact the support surface 14 when the mount 10 is affixed to the support surface 14, as shown in FIG. 3. The circumference of the annular ridge 82 of the cover 70 is generally greater than that of the disc 64, and approximately equal to the circumference of the second end 24 of the housing 20, such that when the mount 10 is assembled the annular ridge 82 abuts the second end 24 of the housing 20 and the disc 64 is fully contained within a second cavity 84 defined between the base 36 and the rear wall 70.

While the present invention is well suited for use with a wireless electronic device, in one embodiment of the present invention, as shown in FIG. 3, the camera 12 may include a wire or cord 85, such as a power supply cord and/or a data transmission cord. In such an embodiment, a portion of the cord 84 may be retained within the assembled mounting fixture 18 to prevent theft of the cord or alternatively to prevent the cord from inadvertently disconnecting from the camera 12. Alternatively, the cord 85 may function as a tether for the camera 12 with or without providing power and/or data transmission.

As shown in FIG. 3, assembly of the mounting fixture 18 includes placing the disc 64 within the cover 70 and then passing fasteners 86 through a first set of apertures 88 in the disc 64, through an overlapping second set of apertures 90 in cover 70, and into the support surface 14. The fasteners 86 extend rearwardly from the wall 80 of the cover, generally parallel to the longitudinal axis 55 of the mount 10, and into the support surface 14. In this configuration, where the rear side 72 of the disc 64 is positioned adjacent the cover 70, an annular channel 92 is formed within the second channel 84 and between the outer perimeter of the disc 64 and annular ridge 82 of the cover 80. A first void 94 and a second void 96 within annular ridge 82 provide access openings in the annular ridge 82 through which a portion of the cord 84 may pass into and out of the channel 92 in the second cavity 84 respectively. During assembly and installation of the mounting fixture 18, a selected length of the cord 85 is placed between the disc 64 and cover 70, with a portion of the cord 85 passing through the first and second voids 94, 96. The disc 64 is rotated until its apertures 88 overlap the apertures 90 of the cover. Fasteners 86 are then passed through the overlapping apertures 88, 90 and anchored into the support surface 14. To ensure that the mount 10 is properly oriented relative to the support surface 14, an indicium 98, such as a directional arrow, may be located on the front side 68 of the cover 64 to indicate the proper annular position of the mounting fixture 18 while it is being fastened to the support surface 14. By way of a non-limiting example, the indicia 98 as shown in FIG. 2 is an arrow identifying the top of the mount 10, which is to be positioned in an upwardly pointed direction when the mounting fixture 18 is affixed to the support surface 14.

Figure 5:
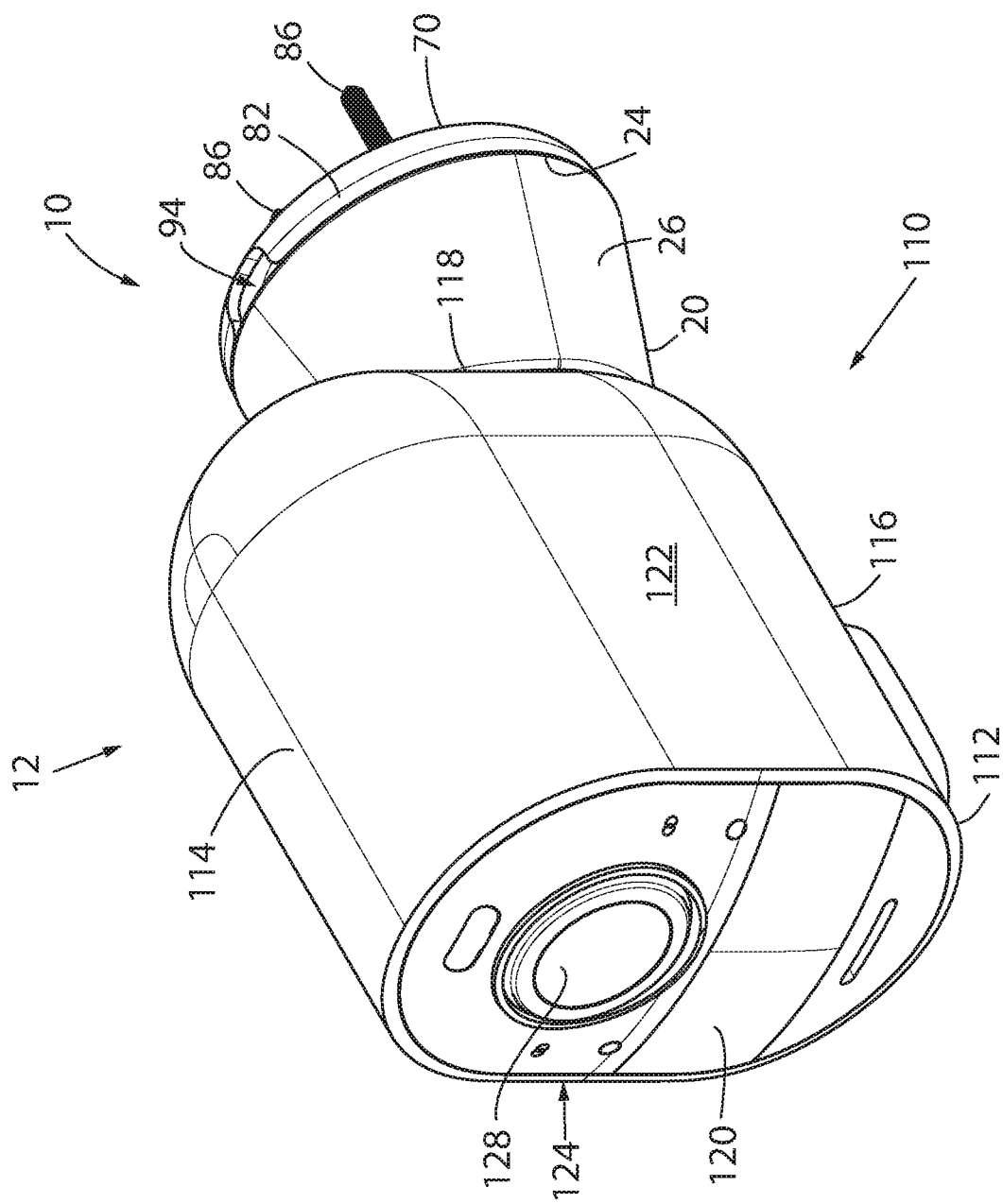
FIG. 5 is a front isometric view of the mount device of FIG. 1, showing the mount engaging a camera.
Figure 6:
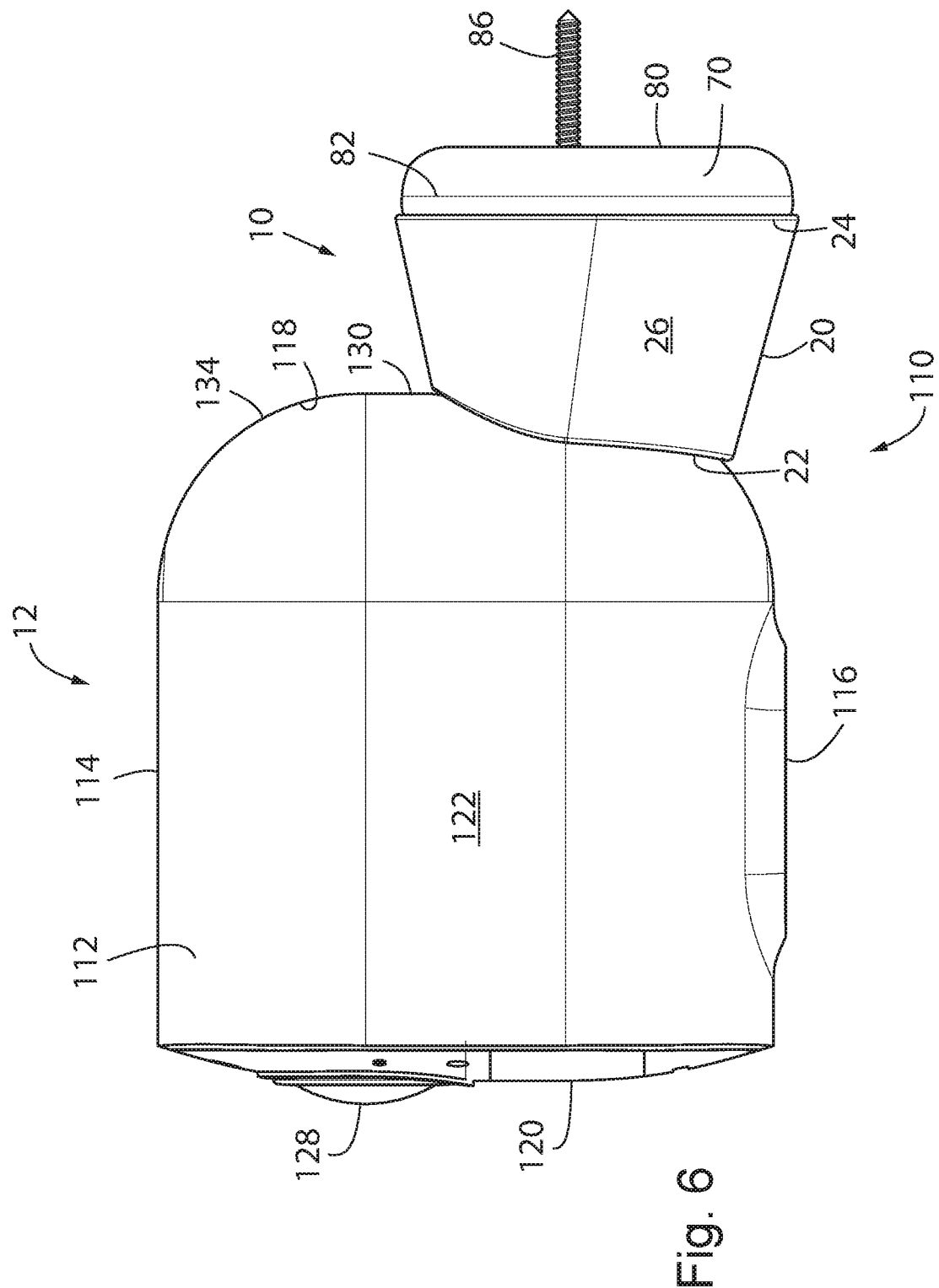
FIG. 6 is a side elevation view of the mount device of FIG. 1, showing the mount engaging a camera in a first angular orientation thereof relative to the mounting device.
Figure 7:
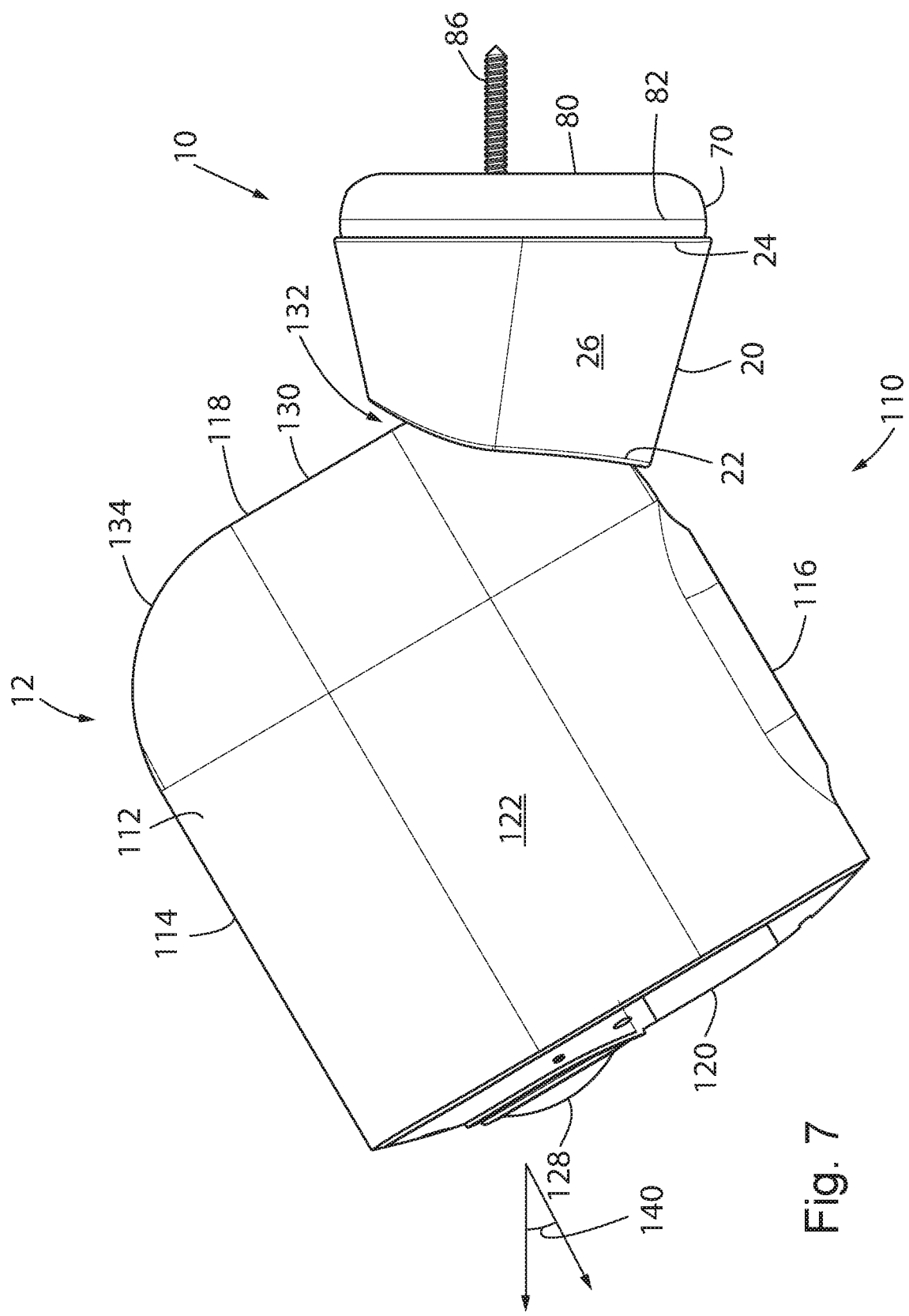
FIG. 7 is a side elevation view of the camera and mount of FIG. 6, showing the camera in a second angular orientation thereof relative to the mounting device.

Turning now to FIGS. 4 through 10, and initially FIG. 5, a mounted camera system 110 is shown in which a battery-powered wireless camera 12, is received within the mounting surface 28 at the first end 22 of the mount body 20. The housing 112 of the camera 12 includes a top surface 114, bottom surface 116, a rear surface 118, a front surface 120 and opposing first and second side surfaces 122, 12. The lens 128 of the camera 12 is disposed within the front surface 120 of the camera, while the mount 10 is configured to engage and secure the housing 112 of the camera 12 generally from the opposing rear surface 118.

Referring now to the partial cross-sectional view of FIG. 4, the rear surface 118 of the camera housing 112 is shown in further detail while being received within the mounting surface 28 at the first end 22 of the mount body 20. The rear surface 118 includes a generally planar portion 130 that is positioned generally about the longitudinal axis 65 of the camera 12, and approximately equidistant from the top surface 114 and bottom surface 116. A bottom or first curved portion 132 of the rear surface 118 is positioned generally between the planer portion 130 and the bottom surface 116 of the housing 112, while an opposing top or second curved portion 134 of the rear surface 118 is positioned generally between the planer portion 130 and the top surface 114 of the housing 112. Both curved portions 132 and 134 form mount engaging locations in this exemplary embodiment, it being understood that other mount engaging locations, located for example at side edges of the housing 112, could be provided instead of or in additional to these mount engaging locations. As shown in FIGS. 4 through 10, the first and second curved portions 132, 134 have an arc angle of approximately 90 degrees in both a longitudinal and latitudinal plane, such that the first and second curved portions form a rounded bullnose transition between the planer portion 130 of the rear surface 118 and the top and bottom surfaces 114, 116 respectively. That is to say that the first and second curved portions 132, 134 are each generally quarter-spherical.

Still referring to FIG. 4, in which the mount 10 is shown engaging the rear surface 118 adjacent the bottom surface 116 of the camera housing 112, the first curved portion 132 of the rear surface 118 is shown engaging the mounting surface 28 at the first portion 32, which exhibits a substantially similar curvature as the first curved portion 132. Simultaneously, the generally planer portion 130 of the rear surface 118 of the camera housing 112 is shown engaging the mounting surface 28 at the second portion 34, which is similarly substantially linear in cross-section such that it is well suited to contact the generally planer portion 130 of the rear surface 118. The relative orientation of the camera 12 and the mount 10 as shown in FIGS. 4-6, 8 and 10 is identified as a neutral orientation, in which the longitudinal axis 55 of the mount 10 is parallel to the longitudinal axis 65 of the camera 12, and the lens 128 in the front surface 120 of the camera housing 112 is generally positioned at a zero annular angle relative to the longitudinal axis 55 of the mount 10.

Still referring to FIG. 4, and as discussed above, the camera 12 is retained in contact with the mount 10 via the magnetic force formed by the magnet 50 disposed within the mount 10 acting upon a ferromagnetic material disposed within the housing 112 of the camera 12. More specifically, the housing 112 of the camera further includes a first ferromagnetic body 136 positioned adjacent the first curved portion 132 and a second ferromagnetic body 138 positioned adjacent the second curved portions 134. The ferromagnetic bodies 136, 138 may be metal or metal alloy plates that are curved to lie within the respective first and second curved portions 132, 134 of the rear surface 118 of the housing 112, as shown in FIG. 4. Alternatively, the ferromagnetic bodies 136, 138 may each be formed of multiple discrete metallic portions disposed over the area of the first and second curved portions 132, 134, which in combination function as ferromagnetic bodies 136, 138, respectively.

During use, magnetic interaction between the magnet 50 and the ferromagnetic bodies 136, 138 permits the camera 12 to be angularly repositioned (panned and/or tilted) to a different angular orientation and to be retained in the new position as will be described in further detail below.

Figure 12:
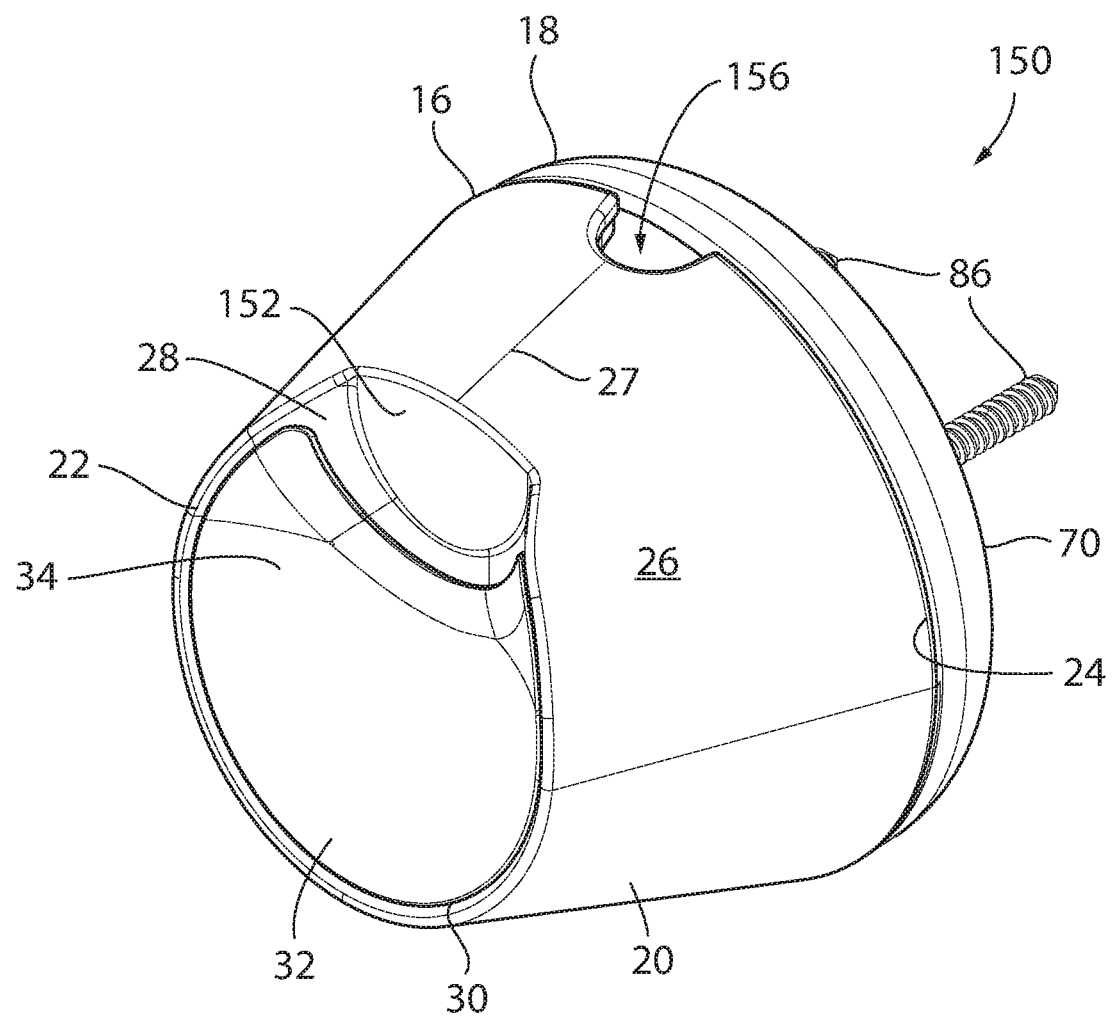
FIG. 12 is a front isometric view of an electronic device mount constructed in accordance with an alternative embodiment of the present invention including a depression in the mounting surface; and, FIG. 13 is a side elevation view of the mount device of FIG. 12 showing the mount engaging the camera in still another angular orientation thereof relative to the mounting device with the mounting device engaging the camera at the first location while the mounting device has been rotated to engage a support surface located below the camera, such as a tabletop.

Beginning with FIGS. 5 and 6, the mounted camera system 110 is shown with the camera 12 mounted to a first mounting location on the camera housing 112, namely with the mounting surface 28 engaging the bottom or first curved portion 132 of the rear surface 118 of the camera housing 112. While in this mounting location, the mount 10 is shown in a first orientation, namely wherein the fasteners 86 extend rearwardly and parallel to the longitudinal axis 65 of the camera 12 such that they affix to a support surface 14 positioned behind the camera 12, as was shown in FIG. 3. As shown in FIG. 12, in an alternative orientation, the mount 10 may be rotated 180 degrees about its longitudinal axis 55 and 90 degrees about its latitudinal axis 33 to engage a horizontal support surface 14, such as a table top, while still attaching to the camera 12 at the first mounting location, i.e., the bottom or first curved portion 132 of the rear surface 118 of the camera housing 112. Furthermore, in FIGS. 5 and 6 the camera 12 is shown in the neutral position, which is to say that the longitudinal axis 65 of the camera 12 is positioned generally colinearly with the longitudinal axis 55 of the mount 10. In the neutral position, the camera lens 128 is directed along the longitudinal axis 55 of the mount 10, such that the camera 12 exhibits zero degrees of pan or tilt relative to the longitudinal axis 55 of the mount 10.

The mating surfaces 28 and 132 or 134 are shaped such that the camera system 110 can accommodate a tilting range or angle 140 of at least 30 degrees unidirectionally from the neutral position. That direction is downwardly in the case of the lower mount engaging location 132 and upwardly in the case of the upper mount engaging s surface 134. That angle could exceed 45 degrees, and it could even approach or exceed 50 degrees. This tilting can be appreciated by comparing FIG. 6 to FIG. 7.

Figure 8:
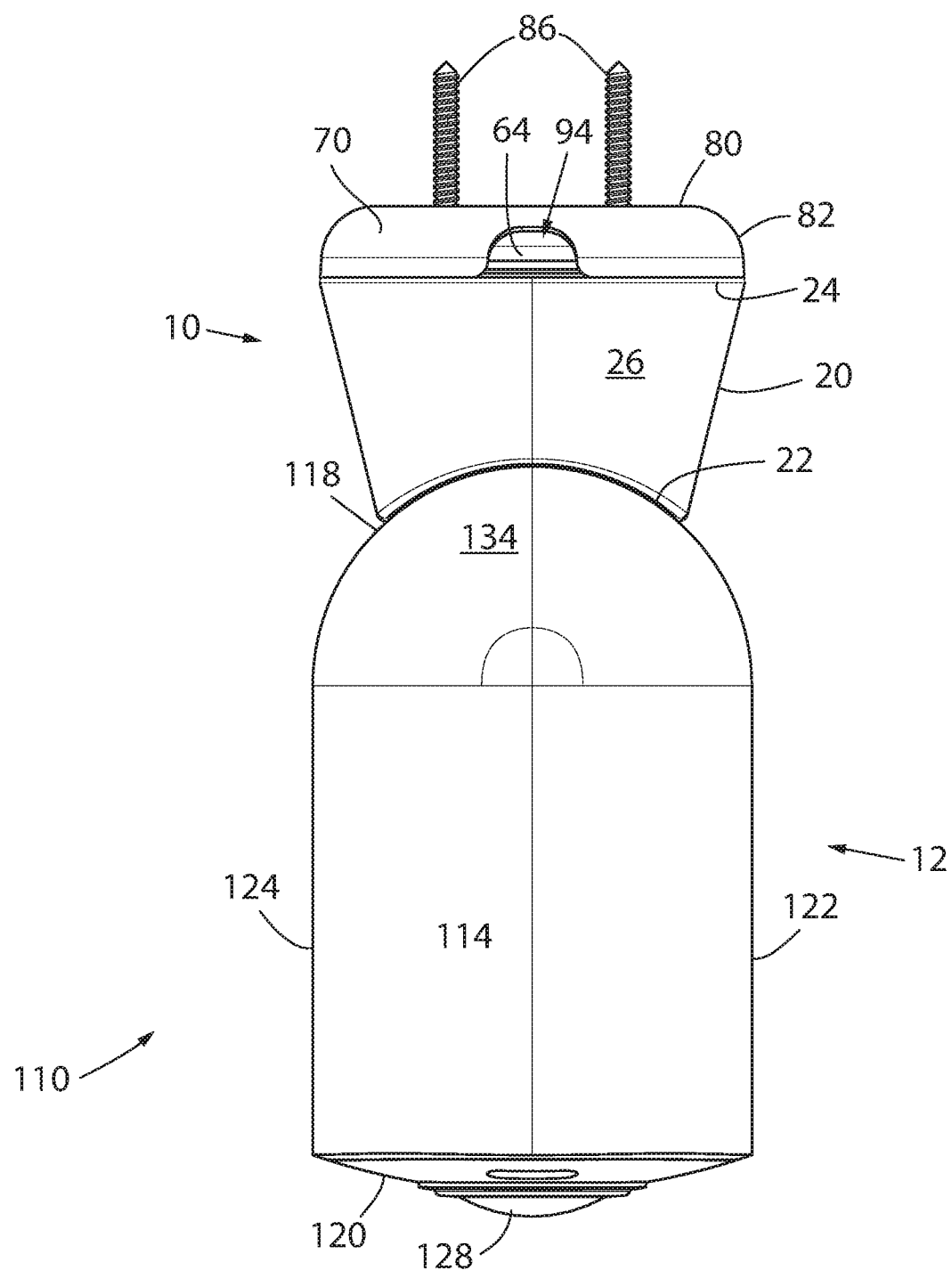
FIG. 8 is a top plan view of the mount device of FIG. 1, showing the mount engaging a camera in the first angular orientation thereof relative to the mounting device.
Figure 9:
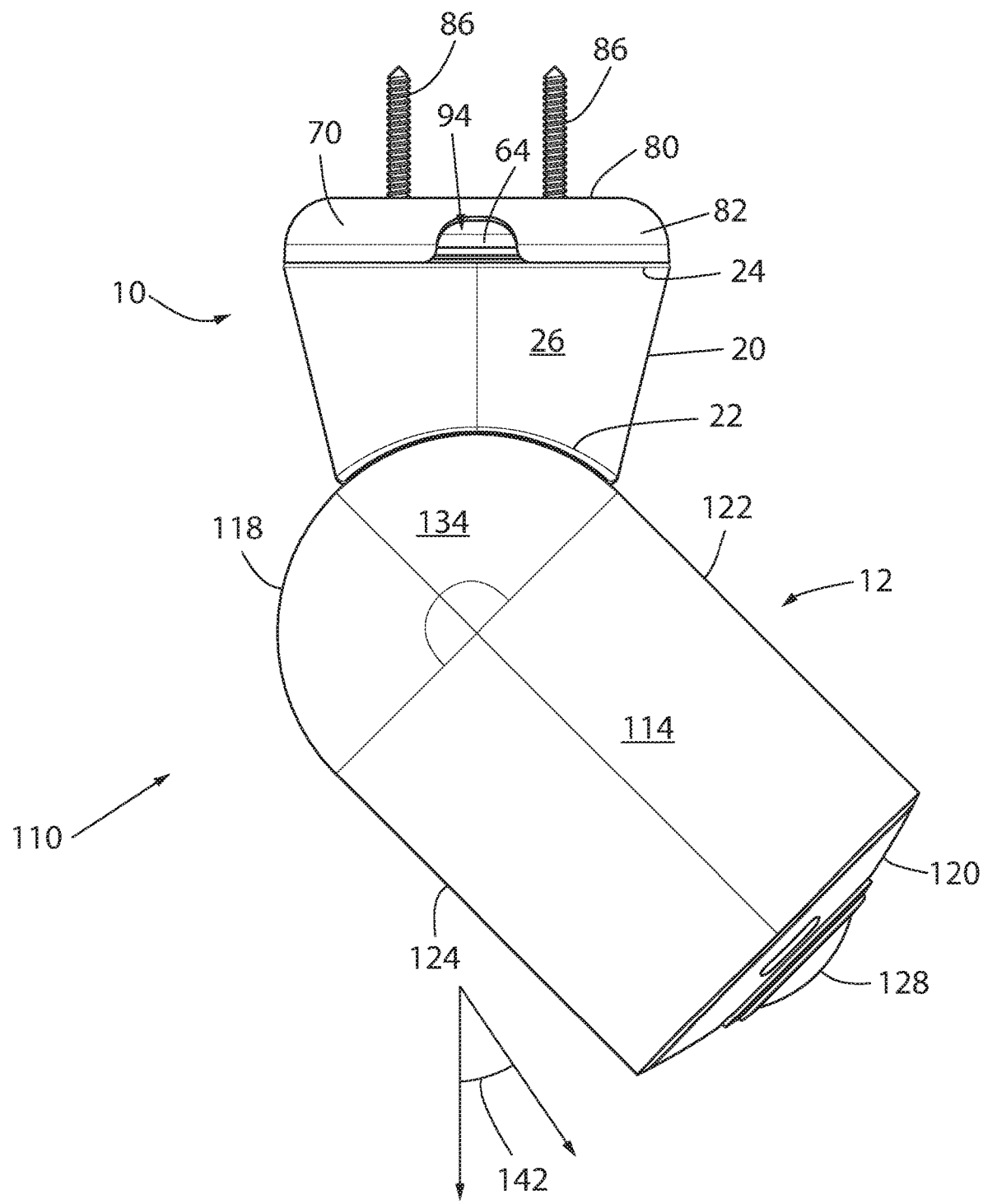
FIG. 9 is a top plan view of the camera and mount of FIG. 8, showing the camera in a third angular orientation thereof relative to the mounting device.

Turning now to FIGS. 8 and 9, the cameras system 110 is shown in a top plan view. Beginning with FIG. 8, the mounted camera system 110 is again shown with the camera 12 mounted at the first mounting location on the camera housing 112, namely with the mounting surface 28 engaging the bottom or first curved portion 132 of the rear surface 118 of the camera housing 112. The mount 10 is also similarly shown in the first orientation, namely wherein the fasteners 86 extend rearwardly and parallel to the longitudinal axis 65 of the camera 12 such that they affix to a support surface 14 positioned behind the camera 12, as was shown in FIG. 3. Furthermore, in FIGS. 5 and 6 the camera 12 is shown in the neutral position, which is to say that the longitudinal axis 65 of the camera 12 is positioned generally parallel to the longitudinal axis 55 of the mount 10, as was previously shown in FIGS. 5 and 6, with the camera lens 128 is directed along the longitudinal axis 55 of the mount 10. In contrast, referring now to FIG. 9, the camera system 110 is shown in which the camera 12 has been panned, i.e., rotated to the side, while remaining mounted at the first mounting location on the camera housing 112, i.e., the first curved portion 132, and the mount 10 remains in the first mounting orientation as was previously described. The mating surfaces 28 and 132 or 134 are shape such that the camera system 110 can accommodate a panning range or angle 142 of at least 30 degrees on either side (i.e., bidirectionally) of the longitudinal centerline of the mount 10. That angle could exceed 45 degrees and could even approach or exceed 50 degrees, approximately between 0 degrees and 50 degrees from the natural position that was shown in FIG. 9. Referring now to FIG. 10, the camera system 110 is shown in an alternative configuration, in which the camera 12 is mounted at the second or upper mounting location on the camera housing 112, namely with the mounting surface 28 engaging the top or second curved portion 134 of the rear surface 118 of the camera housing 112. In mounting the camera system 110 at the second mounting location, while maintaining the camera system 110 in the first orientation, namely wherein the fasteners 86 extend rearwardly and parallel to the longitudinal axis 65 of the camera 12 such that they affix to a support surface 14 positioned behind the camera 12, the mount 10 has been rotated approximately 180 degrees along its longitudinal axis 55 as compared to the configuration illustrated in FIGS. 5-8. In an alternative orientation shown in FIG. 11 and described in further detail below, the mount 10 may be rotated 180 degrees about its longitudinal axis 55 and 90 degrees about its latitudinal axis 33 to engage a generally horizontal support surface positioned above the top 114 of the camera housing 112, such as a ceiling, while still attaching to the camera 12 at the second mounting location, i.e., the top or second curved portion 134 of the rear surface 118 of the camera housing 112. While again shown with the camera 12 in the neutral position in FIG. 10, it should further be understood that the camera 12 is configured to accommodate a both a tilting and panning range of approximately between 0 degrees and 50 degrees from the natural position, as was previously described with the mount 10 in the first mounting position.

FIGS. 3-10, as described above, show the mounting of the camera system 110 in various mounting configurations including both the first curved portion 132 and the second curved portion 134, and at various pan and/or tilt angles therein. However, FIGS. 3-10 are all consistent in that they show the fasteners 86 of the mount 10 extending generally rearwardly of the camera 12, such that they affix to a support surface 14 positioned behind the camera 12, e.g., as a wall. However, as was briefly described above, the mount 10 may also be rotated such that it may be affixed to a ceiling, as shown in FIG. 1, or a tabletop, as shown in FIG. 13. These alternative mounting orientations will now be described in further detail.

Referring initially to FIG. 11, the camera system 110 is shown in an alternative orientation in which the camera 12 is mounted at the second or upper mounting location on the camera housing 112, namely with the mounting surface 28 engaging the top or second curved portion 134 of the rear surface 118 of the camera housing 112. As compared to the mount orientation shown in FIG. 10 in which the fasteners 86 are shown as extending rearwardly of the camera 12 such that they affix to a support surface 14 positioned behind the camera 12, in FIG. 11, the fasteners 86 are shown as extending upwardly above the camera 12 such that they affix to a horizontal support surface 14, such as a ceiling, positioned above camera 12. In mounting the camera system 110 at the second mounting location while maintaining the camera system 110 in this second orientation, the mount 10 has been rotated approximately 180 degrees along its longitudinal axis 55 and 90 degrees about its latitudinal axis 33 as compared to the configuration illustrated in FIG. 10. As a result of this rotation, the first or relatively short side 27 of the sidewall 26 of the mount body 20 which extends from the second portion 34 of the mounting surface 28 to the second end 24 of the body 20, is generally positioned in a forward-facing position that is nearest to the front surface 120 of the camera 12. The opposing second side 29 of the sidewall of the mount body 20 which extends from the first portion 32 of the mounting surface 28 to the second end 24 of the body 20, is generally positioned in a rearwardly facing position that is nearest to the rear surface 118 of the camera 12.

As was previously discussed, the mating surfaces 28 and 134 are shaped such that the camera system 110 can accommodate a tilting range or angle 140 of at least 30 degrees unidirectionally from the neutral position. With the mount 10 of the camera system 110 in the second mounting orientation, i.e., a ceiling attachment, the neutral position is defined as that the longitudinal axis 65 of the camera 12 is positioned generally perpendicular with the longitudinal axis 55 of the mount 10. The resultant tiling angle 140 from this neutral position is in a downward direction as shown in FIG. 11. That angle could exceed 45 degrees and could even approach or exceed 50 degrees.

Turning now to FIGS. 12 and 13, an alternative embodiment of the mount 150 is shown, in which like numbers correspond to like features of previously described mount 10. Notably, mount 150 includes a depression 152 disposed within the second portion 34 of the mounting surface 28, which is positioned at the top half of the mounting surface 28 and above the first portion 32. The depression 152 extends rearwardly from the mounting surface 28 towards to opposing second end 24 of the housing 16 of the mount 150. As will be described in further detail below, and is shown in FIG. 13, the depression 152 is shaped to accommodate a corresponding bulbous projection 154 at the bottom surface 116 of the wireless camera 12 when the mounted camera system 110 is oriented to be affixed to a tabletop. Additionally, a chase or void 156 is located along the second end 24 of the housing 16 of the mount 150. This is in contrast to the configuration of the mount 10 of the first embodiment, which has two voids 94, 96 positioned within the cover 80 of the mounting fixture 18. As shown in FIG. 12 both the depression 152 and the void 156 are generally symmetrically located about the first side 27 of the side wall 26 of the mount body 20. However, it is understood that the void 156 may be positioned at any location about the second end 24 of the housing 16 or alternatively, may be disposed within the mounting fixture 18 as described in the preceding embodiment of mount 10.

Referring now to FIG. 13, the camera system 110 is shown in an alternative configuration, in which the camera 12 is mounted to the mount 150 at the first or lower mounting location on the camera housing 112, namely with the mounting surface 28 engaging the bottom or first curved portion 132 of the rear surface 118 of the camera housing 112. As compared to the mount orientation shown in FIGS. 4-9 in which the fasteners 86 extend rearwardly of the camera 12 such that they affix to a support surface 14 positioned behind the camera 12, in FIG. 13 the fasteners 86 extend downwardly below the camera 12 such that they affix to a horizontal support surface 14, such as a tabletop, positioned below camera 12. In mounting the camera system 110 at the first mounting location, while maintaining the camera system 110 in this third orientation, namely with the fasteners 86 extending downwardly, the mount 150 has been rotated approximately 180 degrees along its longitudinal axis 55 and 90 degrees about its latitudinal axis 33 as compared to the configuration illustrated in FIGS. 4-9. As a result of this rotation, the first side 27 of the sidewall 26 of the mount body 20 is nearest to the front surface 120 of the camera 12. The opposing second side 29 of the sidewall of the mount body 20 is generally positioned in a rearwardly facing position that is nearest to the rear surface 118 of the camera 12.

The camera 12 of FIG. 13 is shown in the neutral position for the third mounting orientation, i.e., a tabletop attachment, in which the longitudinal axis 65 of the camera 12 is positioned generally perpendicular with the longitudinal axis 55 of the mount 150. In this neutral position, the depression 152 of the mount 150 is shown mating with the corresponding bulbous projection 154 at the bottom surface 116 of the wireless camera 12. However, it should be understood that the mating surfaces 28 and 132 are shaped such that the camera system 110 can accommodate a tilting range or angle 140 of at least 30 degrees unidirectionally from this neutral position. With the mount 10 of the camera system 110 in the third mounting orientation, i.e., a tabletop attachment, the resultant tiling angle 140 from this neutral position is in an upward direction. That angle could exceed 45 degrees and could even approach or exceed 50 degrees.

In use, the camera 12 is first positioned in a desired orientation by engaging a selected mount engaging location 132 or 134 on the camera 12 with the mounting surface 28 of the mount 10 with the camera extending at desired pan and/or tilt angles within the ranges described above The camera 12 may be repositioned by first fully removing the camera 12 from the mount 10, e.g., overcoming the magnetic force exerted by the magnet 50 on the ferromagnetic camera housing 112, and then replacing the camera housing 112 into the mounting surface 28 of the mount 10 at the desired repositioned orientation, thereby panning and/or tilting the camera 12 to achieve the desired camera field of view. Alternatively, the camera 12 may be slidably repositioned within the mount 10, without complete physical separation of the camera 12 from the mounting surface 28, also by exerting a force on the camera housing 112 sufficient to overcome the magnetic force of the magnet 50 and ferromagnetic camera housing 112. In either application the magnetic force of the magnet 50 exerted on the camera housing 112 is approximately between 2 kgf to 3 kgf, and more typically approximately a magnitude of 2.3 kgf. Accordingly, an opposing force sufficient to overcome the magnetic force must be applied by a user on the camera 12 if the camera housing 112 is to be fully disengaged from the mount 10. Alternatively, the force required to rotate the cameras housing 112 when it is seated against the mounting surface 28, i.e., without first disengaging the camera housing 112 from the mounting surface 28 must be of sufficient magnitude to the frictional force between the mounting surface 28 and the rear surface 118 of the housing 112. In one embodiment of the present invention, the force required to rotate the camera may have a magnitude of approximately 0.6 kgf to 1 kgf, and more typically approximately a magnitude of 0.8 kgf, when the force is applied to the camera housing 112.

After the cameras 12 has been adequately positioned, the magnetic force exerted on the cameras housing 112 and the resultant frictional force at the mounting surface 28 is sufficient to maintain the cameras 12 in its repositioned orientation.

If desired, the field of view can be further altered by removing the camera 12 from the mount and engaging the other mount engaging location 134 or 132 with the mounting surface 28, again positioning the camera 12 relative to the longitudinal centerline of the mount 10 to obtain the desired pan and/or tilt angles. The angular orientation of the camera 12 relative to the mount can thereafter be varied to once again adjust the pan and/or tilt angles.

It is contemplated that an alternative embodiment may incorporate any of the features of the previous embodiment described above.

Many other changes and modifications could be made to the invention without departing from the spirit thereof.

What is claimed is:

1. A directionally adjustable mounted electronic device, comprising:
   an electronic device having a housing having a plurality of mount engaging locations disposed on an outer surface thereof, the mount engaging locations being spaced from one another;
   a mount having:
      a curved mounting surface disposed at a first end portion of the mount,
      a magnet having a surface generally tangential to the curved mounting surface, and
      a mounting fixture configured for attachment to a support at an opposing second end portion of the mount; and
   the mounting surface of the mount being configured to selectively and alternatively magnetically engage any one of the plurality of the mount engaging locations on the housing to securely retain the housing on the mount in an angular orientation that is variable relative to a longitudinal centerline of the mount.

2. The directionally adjustable mounted electronic device of claim 1, wherein, when the mounting surface of the mount engages a selected one of the mount engaging locations on the housing, the orientation of the housing is angularly variable bidirectionally orthogonally relative to a latitudinal centerline and a vertical centerline.

3. The directionally adjustable mounted electronic device of claim 2, wherein, when the mounting surface of the mount engages a selected one of the mount engaging locations on the housing, the orientation of the housing is variable through an angular range of motion in first and second mutually orthogonal directions of at least 30 degrees in both directions.

4. The directionally adjustable mounted electronic device of claim 3, wherein, when the curved mounting surface of the mount engages a selected one of the mount engaging locations on the housing, the orientation of the housing is variable 1) unidirectionally in the first direction through an angle of at least 30 degrees and 2) bidirectionally in the second direction through an angle of at least 60 degrees.

5. The directionally adjustable mounted electronic device of claim 4, wherein an orientation of the mounting fixture configured for attachment to the support at the opposing second end portion of the mount is variable between a first orientation and a second orientation that is approximately perpendicular to the first orientation, when the mounting surface of the mount engages a selected one of the mount engaging locations on the housing.

6. The directionally adjustable mounted electronic device of claim 5, wherein the mount is rotated approximately 180 degrees about a longitudinal axis and 90 degrees about a latitudinal axis when the mounting fixture is oriented in the second orientation, relative to the first orientation.

7. The directionally adjustable mounted electronic device of claim 4, further comprising a cord retention cavity in the mounting fixture.

8. The directionally adjustable mounted electronic device of claim 1, wherein the mount engaging locations include first and second mount locations located at upper and lower corners of the housing, respectively.

9. The directionally adjustable mounted electronic device of claim 1, wherein the mounting surface at the first end of the mount is generally concave.

10. The directionally adjustable mounted electronic device of claim 1, wherein a first portion of the mounting surface is curved about two generally perpendicular axes.

11. The directionally adjustable mounted electronic device of claim 10, wherein a second portion of the mounting surface is curved about one centerline.

12. The directionally adjustable mounted electronic device of claim 1, wherein a portion of each of the mount engaging locations of the housing is curved and configured to mate with a portion of the curved mounting surface.

13. The directionally adjustable mounted electronic device of claim 1, wherein a portion of each of the mount engaging locations on the housing is convex.

14. A directionally adjustable mounted camera system, comprising:
   a camera having a camera housing, the camera housing having a longitudinal centerline, a front surface, and an opposing rear surface, the rear surface having a plurality of mutually spaced curved mount engaging locations;
   a camera lens disposed within the front surface of the camera housing;
   a camera mount having a curved mounting surface disposed at the first end of the camera mount and a releasably affixed mounting fixture configured for attachment to a support at an opposing second end of the camera mount, wherein the curved mounting surface at the first end of the mount is an irregular curved concave mounting surface;

the curved mounting surface of the camera mount being configured to selectively and alternatively magnetically engage any one of a plurality of the mount engaging locations on the camera housing to securely retain the camera on the mount in an angular orientation that is variable both laterally and vertically relative to a longitudinal centerline of the camera mount through a range of at least 30 degrees.

15. The directionally adjustable mounted camera system of claim 14, wherein, when the curved mounting surface of the camera mount engages a selected one of the mount engaging locations on the camera housing, the camera is positionally adjustable 1) vertically unidirectionally relative to the longitudinal centerline of the camera mount by at least 30 degrees in order to alter a tilt angle of the camera and 2) laterally bidirectionally relative to the longitudinal centerline of the camera mount by at least 30 degrees in order to alter a pan angle of the camera.

16. The directionally adjustable mounted camera system of claim 14, wherein a portion of each of the curved mount engaging locations of the camera housing is convex and configured to mate with a portion of the irregular concave mounting surface.

17. A method of adjusting the position of a camera relative to a mount fixture affixed to a support surface, the mount fixture being provided on a second end portion of a camera mount having a curved mounting surface disposed at a first end portion thereof, the camera mount having a magnet with a surface generally tangential to the curved mounting surface, the camera having a camera housing having a plurality of spaced mount engaging locations disposed on an outer surface thereof, the method comprising:

magnetically engaging a first of the mount engaging locations on the camera housing with the mounting surface of the camera mount with sufficient force to retain the camera in an orientation in which a longitudinal centerline of the camera extends at a first angle relative a longitudinal centerline of the camera mount;

repositioning the camera such that the first mount engaging location on the camera housing magnetically engages the mounting surface of the camera mount with sufficient force to retain the camera in an orientation in which the longitudinal centerline of the camera extends at second angle relative the longitudinal centerline of the camera mount; then repositioning the camera such that a second mount engaging location on the camera housing magnetically engages the mounting surface of the camera mount with sufficient force to retain the camera in an orientation in which the longitudinal centerline of the camera extends at a third angle relative the longitudinal centerline of the camera mount.

\* \* \* \* \*